United States Patent

[11] 3,618,634

| | | |
|---|---|---|
| [72] | Inventor | Vaughn A. Nelson<br>Downers Grove, Ill. |
| [21] | Appl. No. | 756 |
| [22] | Filed | Jan. 5, 1970 |
| [45] | Patented | Nov. 9, 1971 |
| [73] | Assignee | International Harvester Company<br>Chicago, Ill. |

[54] HYDRAULIC CONTROL VALVE WITH FLOW-SENSITIVE UNLATCHING MECHANISM
13 Claims, 2 Drawing Figs.

[52] U.S. Cl. .................................................. 137/624.27,
91/418
[51] Int. Cl. ............................................... F15b 13/01
[50] Field of Search .......................................... 91/426,
418; 137/624.27

[56] References Cited
UNITED STATES PATENTS

| | | | |
|---|---|---|---|
| 2,848,014 | 8/1958 | Tennis ......................... | 137/624.27 |
| 3,106,065 | 10/1963 | Stacey ......................... | 137/624.27 X |
| 3,132,668 | 5/1964 | Stacey ......................... | 137/624.27 |
| 3,247,768 | 4/1966 | Tennis ......................... | 137/624.27 X |

FOREIGN PATENTS

| | | | |
|---|---|---|---|
| 963,922 | 7/1964 | Great Britain................ | 137/624.27 |

Primary Examiner—Martin P. Schwadron
Assistant Examiner—Irwin C. Cohen
Attorney—Floyd B. Harman ABSTRACT: A hydraulic control valve for use in a fluid pressure system that operates a pressure-actuated cylinder, the valve including a detent latching mechanism for holding the control valve in position during a power stroke of the cylinder, and a flow-sensitive valve mechanism effective to prevent the operation of the latching mechanism until the cylinder has completed its stroke. The detent mechanism is unlatched by a fluid-pressure-responsive piston and the flow-sensitive valve mechanism limits the application of pressure to this piston until the flow of working fluid has ceased.

PATENTED NOV 9 1971

3,618,634

INVENTOR
VAUGHN A. NELSON
BY
Dony L. Bahr
ATT'Y.

HYDRAULIC CONTROL VALVE WITH FLOW-SENSITIVE UNLATCHING MECHANISM

BACKGROUND OF THE INVENTION

This invention relates to hydraulic control valves for controlling the flow of fluid to and from hydraulic cylinders and more particularly to a control valve including a flow-sensitive device to prevent premature unlatching of a detent mechanism until the cylinder has completed its stroke.

Conventional pressure unlatch hydraulic control valves are well known and are designed to unlatch whenever the pressure applied to a working hydraulic cylinder reaches a predetermined value. Such flow control valves are illustrated by U.S. Pat. No. 2,848,014 and include a spool reciprocable from a neutral position to positions for directing fluid to either end of a cylinder. A detent device, attached to the spool, holds same in the reciprocated position until the fluid pressure within the cylinder reaches the designed value, at which time the detent latches and biasing means return the spool to a neutral position. Such pressure unlatch devices, however, are undesirable in the sense that unlatching may occur before the cylinder reaches the end of its stroke, since a heavy load may result in sufficient pressure increase to unlatch the detent mechanism. Thus, to insure that the cylinder reaches its limit limit of travel, it may be necessary to continually apply manual force to the spool, an undesirable result.

Similarly, the hydraulic systems of the prior art for operating cylinders are designed to operate at some pressure or range of pressures, and include a system relief valve which opens whenever the system pressure reaches some predetermined maximum. Because of manufacturing tolerances required on system relief valves and on the unlatching mechanisms, and to provide for wear on these parts with use, the predetermined unlatching pressure of a conventional valve must be lower than the system relief valve pressure by as much as 25 percent. This means that the hydraulic cylinder must be of sufficient size to operate for its intended use without exceeding 75 percent of the relief valve pressure. Otherwise, the control valve might unlatch prior to the cylinder reaching the limit of its stroke. A similar difficulty is that such pressure unlatch valves are not adaptable to incorporation into fluid systems having different maximum pressures, but instead a separate unlatch mechanism must be designed for each such system.

SUMMARY OF THE INVENTION

It is therefore an object of my invention to provide a control valve which includes a fluid flow-sensitive valve mechanism that is effective to prevent the unlatching mechanism from operating until the cylinder has completed its stroke as sensed by the cessation of fluid flow to or from the cylinder. This permits the system designers to utilize a working cylinder having approximately a 25 percent smaller piston area with a comparable reduction in cost.

It is another object to provide a universal type of hydraulic control valve that is sensitive primarily to fluid flow and is operable in various hydraulic systems having a wide range of working pressures.

DESCRIPTION OF THE PREFERRED EMBODIMENT

Figures 1, 2:
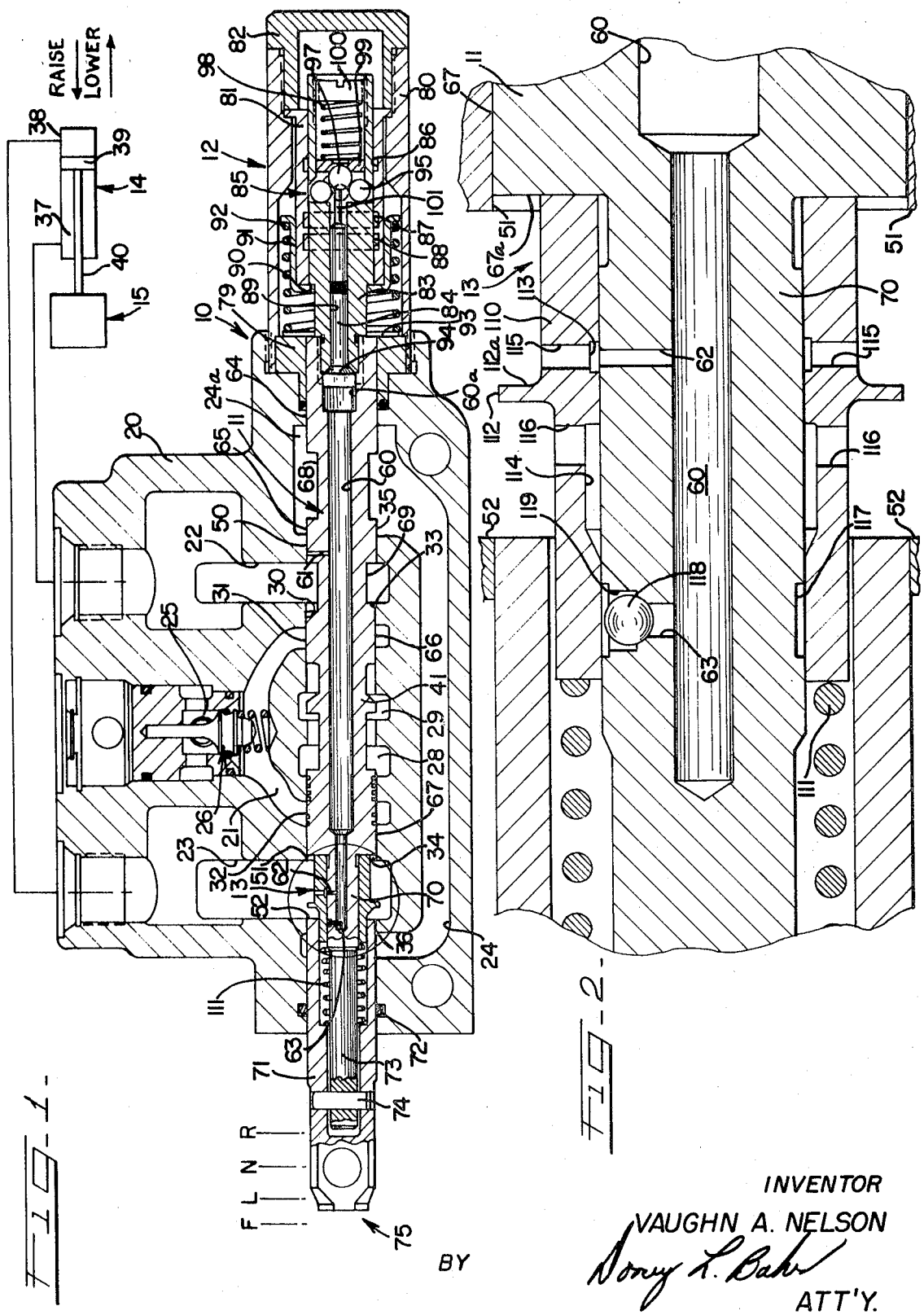
FIG. 1 is a longitudinal sectional view of the open center hydraulic control valve of the present invention.
FIG. 2 is an enlarged fragmentary view of the flow-sensitive portion of the valve.

The hydraulic control valve of the present invention is designated generally by the numeral 10 and comprises a housing 20 having a cylindrical spool 11 reciprocal therein, a latching mechanism 12, and a flow-sensitive control portion 13 adapted to control a working cylinder 14 which can raise and lower, or otherwise move, a load 15.

The valve 10 has a main housing 20 of the conventional open center type and is formed with an inlet 25 connected to a high-pressure branch passage 21, and open center passages 28, 29, (the connection between the inlet 25 and open center passage not being shown). The inlet port 25 is connected to a fluid energy source (not shown), poppet valve 26 being interposed between the inlet port 25 and high-pressure passage 21.

The housing 20 is also formed with a longitudinal cylindrical bore 30 in which the spool 11 is disposed for longitudinal reciprocal movement. Communicating with bore 30 are inlet ports 31 and 32 of passage 21, outlet ports 33, 34, and exhaust ports 35 and 36. The inlet port 31 is connected to one branch of the high pressure passage 21 and port 32 is connected to another branch of passage 21. The outlet port 33 surrounds the bore 30 and is connected to outlet conduit 22. The outlet port 34 is an enlarged cavity surrounding the bore 30 and the flow-sensitive control portion 13 and is connected to the outlet conduit 23. The exhaust ports 35 and 36 open into the drain conduit 24 so as to return fluid to a sump (not shown) through a return chamber 24A.

The conduit 22 is connected to supply fluid pressure to the rod end 37 of the cylinder 14, and the conduit 23 is connected to supply fluid pressure to the other end 38. A piston 39 disposed within the cylinder 14 is connected by means of a shaft 40 to move the load 15.

The walls of the bore 30 define a fluid-sealing surface at 50, and fluid-restricting shoulders at 51 and 52 as well as at other points throughout its length. Reciprocating within the bore 30 is a spool 11 generally in the form of a cylindrical rod and having an internal axial bore 60, radial bores 61, 62, and 63, lands 64, 65, 66, 41 and 67, annular grooves 68 and 69, and a reduced diameter end portion 70. The radial bore 61 opens into the axial bore 60 and extends radially outward through the land 65, and the bores 62 and 63 extend radially outward through the end portion 70. The operation of the bores 62 and 63 will be described more completely in conjunction with the description of the flow-sensitive portion 13, hereinafter. The annular groove 68 is located between lands 64 and 65, and the groove 69 is located between lands 65 and 66.

A cylindrical extension 71 of the spool 11 extends through the bore 30 to the outside of the housing 20 and comprises a tube forming a sliding seal within the bore 30 by means of an O-ring 72. The tube 71 is attached to a solid extension 73 of the spool 11 by means of a radial connecting pin 74. The extension 71 is connected to be operated manually by a suitable control linkage (not shown) at 75.

The end of the spool 11 adjacent the land 64 abuts against and is operably connected to the latching or detent mechanism 12. The mechanism 12 comprises a tubular housing 80 connected to the housing 20 and axially aligned with the bore 30, a detent sleeve 81 anchored within the housing by a capscrew 82, and a sliding detent valve body 83 carrying an axially movable piston 84 and a detent ball mechanism 85. The detent sleeve 81 is formed on its interior with internal annular grooves 86, 87 and 88 which are adapted to cooperate with the detent ball mechanism 85. The valve body 83 is formed with an axial central bore 89 in which the piston 84 is disposed, and with an enlarged shoulder at 90. A spring-retaining cup 91 surrounds the valve body 83 and abuts against the shoulder 90. A bias spring 92 is compressed between a washer 93 and the cup 91 and tends to force the cup 91 and valve body 83 to the right as shown in FIG. 1, until the shoulder 90 registers with the end of sleeve 81. The washer 93 surrounds the valve body 83 and abuts the end of land 64 tending to move the spool 11 to the left until the washer 93 bottoms out at the inner end of an abutting element 79 of the housing 80. The valve body 83 is rigidly attached to the spool 11 and the bore 60 is enlarged at 60 to allow limited axial movement of the head 94 of piston 84 therewithin.

The detent ball mechanism 85 comprises three radially movable detent balls 95 which are caged within the valve body 83, an axially movable backing ball 97, and a bias spring 98. The spring 98, compressed between a ball-retaining cup 99 and a capscrew 100 at the end of valve body 83 urges the ball 97 against the balls 95 so as to move them outwardly. When the spool 11 is moved into an operative position, the balls 95 releasably engage one of the grooves 86, 87 or 88, and the valve 11 is effectively latched in place until released. Such engagement occurs when spool 11 is moved to the indicated positions of "Float," "Lower," or "Raise." The detent ball mechanism 85 is released from the "Lower" or "Raise" positions by the operation of the piston 84 which carries an axially extending pin 101 adapted to move the backing ball 97 to the right and release the balls 95 from the appropriate groove, thereby unlatching the mechanism 12 and allowing the spool 11 to return to neutral position under the centering bias of spring 92 as will be described in detail later. A seal (unnumbered) may be provided for piston 84.

The flow-sensitive portion 13 (see FIG. 2) of the valve 10 comprises a tubular sleeve valve 110 surrounding the reduced diameter portion 70 of spool 11, and a bias spring 111. The spring 111 is compressed to urge the sleeve 110 to the right against shoulder 67 adjacent land 67. The sleeve valve 110 is formed with an enlarged land 112 formed on radially extending ringlike portion 112, internal annular grooves 113 and 114, and a plurality of radial ports 115 and 116 opening into the grooves 113 and 114 respectively. The land 112 forms a close but free fit with the bore 30. The groove 113 is adapted to register with the radial bore 62 when the sleeve 110 is urged to the limit of its movement to the right. The reduced diameter end portion 70 is also formed with an annular groove 117 in registry with the radial bore 63. A ball check valve 118 rests in an enlarged bore 119 and blocks the passage of fluid between the bore 63 and groove 117 except under certain operative conditions to be described later.

The operation of the control valve 10 is now described as it might be employed in connection with a hydraulic cylinder for a farm implement or the like. It should be understood, however, that the principles of the invention may be applied in numerous other applications where a hydraulic fluid is employed as a working medium.

In a neutral position as shown, fluid flows from inlet 25 through open center passages 28, 29 and back to sump in the conventional manner. However, if the control valve 10 is placed in the "Raise" or "R" position by manual movement of the sleeve 71 and spool 11 is shifted to the right to the "R" position indicated in FIG. 1, land 67 will preclude such flow, and fluid is directed to high-pressure passage 21. In this position, the inlet port 32 is uncovered and fluid under pressure passes from the inlet port 25 past the check valve 26 through the passage 21 and port 32, through the exposed portion of the bore 30 into conduit 23 and the end 38 of the cylinder 14. As the fluid pressure builds up within the cylinder 14, the force acting against the piston 39 tends to move piston rod 40 to raise the load 15.

Movement of the spool 11 to the right also moves the washer 93 and latching valve body 83, compressing the spring 92, and the backing ball 97 forces the detent balls 95 into engagement with the groove 86. The spool valve 11 is thus effectively latched in this position until released.

Shifting the spool 11 to the right also tends to move the sleeve valve 110 to the right so that the land 112 enters the bore 30 past the edge 51. However, while fluid is flowing to fill the cylinder 14, the pressure of the fluid forces the sleeve valve 110 to the left against the force of the spring 111. Stated differently, as the land 112 starts to enter the bore 30, and while there is fluid flowing from branch passage 21 to outlet conduit 23, the land 112 forms an orifice with the edge 51 causing a drop in fluid pressure. This orifice effect creates a higher pressure on the right side of the land 112 which causes the sleeve valve 110 to be shifted to the left against the bias of the spring 111. Some leakage fluid may also enter the bore 60 through the ports 115 and radial bore 62. However, any fluid thus entering the bore 60 is readily drained through the now open bore 61 into return chamber 24. Ball check valve 118 will act to prevent flow into bore 60 from conduit or port 23.

The bore 61 does not constitute a significant restriction to fluid flow for this transient condition and, therefore, pressure which might otherwise build up within the bore 60 and act on piston 84 is insufficient to cause it to move and operate the unlatching mechanism.

When the piston 39 in cylinder 14 reaches or nears the end of its stroke, fluid flow through the outlet conduit 23 ceases, and the spring 111 forces the sleeve 110 to the right against the land 67. In this position, the annular groove 113 is in registry with the bore 62 and a relatively large amount of fluid enters the central bore 60. The radial bore 61 acts as a restriction to the increased fluid flow and the pressure builds up within the bore 60 which fluid acts against the head 94 of piston 84 moving it to the right causing pin 101 to contact the ball 97 to release the latching detent mechanism 85. Release of the detent balls 95 allows the spring 92 to act against the spool 11 and return it to the position shown in FIG. 1.

The control valve 10 is placed in the "Lower" or "L" position by manual movement of the sleeve 71 and spool 11 to the left to the "L" position as shown. In this position open center passages 28, 29 are closed by land 41, inlet port 31 is uncovered and fluid under pressure is permitted to flow from the passage 21 through the port 31 and annular groove 69 into the outlet conduit 22 and to the "rod" end 37 of the cylinder 14. Movement of the spool 11 to the left moves the detent valve body 83, compressing the spring 92, and allowing the detent balls 95 to engage the groove 87 latching the spool 11 in place.

Movement of the spool 11 to the left also forces the land 112 to enter the bore 30 past the edge 52. The fluid returning from head end 38 through the conduit 23 is subject to pressure due to the weight of the load 15 acting on the piston 39 and the additional pressure applied to the opposite side of piston 39 through conduit 22. The fluid pressure within conduit 23 forces the sleeve 110 still farther to the left against the force of the spring 111, opening the port 36, and allowing this fluid to drain into the drain conduit 24.

When the valve spool 11 is in the "L" position, the radial port 61 is open to the fluid pressure existing in the outlet conduit 22 and fluid does enter the bore 60 through the port 61. However, the fluid entering the bore 60 is readily drained through the relatively large radial bore 63, past the ball check valve 118, and through the annular groove 114 and ports 116 into the drain conduit 24. Thus, as long as fluid is being exhausted from the conduit 23, the fluid pressure within the bore 60 does not attain a sufficient magnitude to unlatch the mechanism 12. When the piston 39 reaches the end of its stroke and fluid is no longer expelled through conduit 23, the spring 111 returns the sleeve 110 into position abutting the land 67. In this position, the radial bore 63 is closed by the sleeve 110 and fluid flow into bore 60 causes an increase in the pressure so as to actuate the piston 84 to release the latching mechanism 85. Under this condition, radial bore 62 acts as a restrictor. Release of the detent mechanism 85 again permits the spring 92 to return the valve piston 11 to the position shown in FIG. 1.

The flow-sensitive mechanism 13 has been shown and described in operation in a double-acting fluid pressure system. However, it can be seen readily, this principle could be adapted to work with equal facility in a single-acting system, and could also be incorporated into a closed center valve of a constant pressure system.

It should be apparent from the foregoing description that the hydraulic control valve of the present invention is sensitive in its operation to the flow of fluid. This flow-sensitive feature does not allow the replacement of the system relief valve because such a relief valve is presumed still to be present in the system, although it is not shown herein. The flow-sensitive feature of the present invention will prevent the control valve from unlatching until the cylinder has reached the end of its stroke, even if system pressure approaches relief valve pressure. This invention also allows the control valve to be used in a hydraulic system regardless of its maximum relief valve pressure. The control valve of the present invention thus becomes a universal type affording great potential in standardizing design, and reducing manufacturing and marketing costs.

It is to be understood that the invention shown and described is by way of example only and is not to be considered as limited thereto except insofar as the claims may be so limited.

What is claimed is:

1. A hydraulic control valve for directing fluid from a fluid energy source to a working cylinder having a reciprocating piston and comprising:
    a housing:
    a selectively movable valve spool means within said housing;
    a latching mechanism connected to said valve spool means and effective to hold it in a selected position;
    a fluid pressure actuated latching release means effective to release said latching mechanism; and
    fluid-flow-sensitive valve means arranged to control the fluid pressure directed to said latching release means and responsive to fluid flow to the working cylinder and effective to prevent the actuation of said latching release means until the cessation of fluid flow to said cylinder when said reciprocating piston reaches a limit of its stroke.

2. The control valve of claim 1 wherein:
    said valve spool is formed with an axial bore for directing fluid energy to said latching release means upon cessation of flow through said valve.

3. The control valve of claim 2 wherein:
    said latching release means includes a longitudinally movable piston that is responsive to the fluid energy within said bore to unlatch said latching mechanism.

4. The control valve of claim 3, wherein:
    said fluid-flow-sensitive valve means includes a fluid-flow-restricting land- and spring-bias means acting in opposition to fluid flow past said land and effective to move said valve means when fluid flow therepast ceases so as to permit fluid energy to be transmitted through said axial bore to actuate said latching release means.

5. The control valve of claim 4 wherein:
    said fluid-flow-sensitive valve means includes a valve sleeve surrounding said valve piston, said valve sleeve being effective to prevent the entry of fluid into said bore while fluid is flowing past said flow-restricting land.

6. A hydraulic control valve and latching mechanism for use in a hydraulic system adapted to direct fluid under pressure from a fluid source to a movable piston having a limited stroke and comprising:
    a housing;
    a cylindrical spool valve longitudinally movable within said housing into a selectable position for communicating the fluid source with the piston and held in such position by said latching mechanism; a fluid-pressure-actuated release means effective to release said latching mechanism; and
    a flow responsive cylindrical valve sleeve surrounding said spool valve and longitudinally movable thereon in response to fluid flow through said spool valve and arranged to control said release means to effect release of the latching mechanism only upon cessation of said fluid flow.

7. The hydraulic control valve of claim 6 including:
    fluid conduit means in communication with said latching release means and effective to direct fluid from the source thereto for unlatching, said valve sleeve being effective to preclude said fluid flow to said latching release means until fluid flow to said piston ceases.

8. The hydraulic control valve of claim 7, said latching release means includes a longitudinally movable piston contained in said valve spool and responsive to fluid pressure from the source to unlatch the latching mechanism.

9. A hydraulic control system for operating a fluid pressure-actuated hydraulic cylinder having a piston movable through a limited stroke and comprising:
    a source of fluid energy;
    a spool valve formed with fluid-directing conduits and ports and selectively movable into at least one position for directing fluid from said source to the piston;
    a fluid pressure releasable latching mechanism attached to said spool valve and effective to latch it in a selected position; and
    a movable fluid-flow-responsive valve interposed between said source and the piston and effective to block the application of fluid pressure to said latching mechanism until the piston reaches the end of its stroke and fluid flow thereto ceases.

10. The hydraulic control system of claim 9 wherein:
    said fluid flow responsive valve comprises a valve sleeve surrounding said spool valve and formed with a fluid-flow-restricting land that tends to restrict the flow of fluid from said source to the piston and is effective when moved by the force due to fluid flow to block the application of fluid pressure to the latching mechanism.

11. The hydraulic control system of claim 10 and including:
    a compressible spring that is compressed by the movement of said valve sleeve and is effective to return said valve sleeve when fluid flow to the piston ceases so as to allow the application of fluid pressure to the latching mechanism.

12. In a directional flow control valve having a reciprocable spool and porting for selectively directing fluid energy from a source to a motor, the improvement comprising:
    1. detent means associated with said spool for holding said spool in a reciprocated position which permits flow to or from a motor,
    2. a pressure-actuated release means for releasing said detent means, and
    3. a flow-sensitive valve means on said control valve for directing fluid to said release means upon cessation of flow through said control valve so as to release said detent means whereby the spool may return to a neutral position.

13. An apparatus as defined in claim 12 in which said flow-sensitive means comprises a biased sleeve sensitive to flow and having ports therein for directing fluid to said release means upon cessation of flow.

* * * * *